(12) United States Patent
Watson et al.

(10) Patent No.: US 9,805,833 B2
(45) Date of Patent: Oct. 31, 2017

(54) PASSIVELY INITIATED DEPRESSURIZATION VALVE FOR LIGHT WATER REACTOR

(71) Applicant: BWXT mPower, Inc., Charlotte, NC (US)

(72) Inventors: Ronald C Watson, Forest, VA (US); John D Malloy, Goode, VA (US)

(73) Assignee: BWXT mPower, Inc., Charlotte, NC (US)

( * ) Notice: Subject to any disclaimer, the term of this patent is extended or adjusted under 35 U.S.C. 154(b) by 653 days.

(21) Appl. No.: 14/296,831

(22) Filed: Jun. 5, 2014

(65) Prior Publication Data

US 2015/0194225 A1    Jul. 9, 2015

Related U.S. Application Data

(60) Provisional application No. 61/924,038, filed on Jan. 6, 2014.

(51) Int. Cl.
*G21C 9/004* (2006.01)
*G21C 13/02* (2006.01)

(52) U.S. Cl.
CPC ............. *G21C 9/004* (2013.01); *G21C 13/02* (2013.01); *Y02E 30/40* (2013.01)

(58) Field of Classification Search
CPC ....... G21C 9/004; G21C 13/022; G21C 13/02
USPC ......................................... 376/283; 251/63.6
See application file for complete search history.

(56) References Cited

U.S. PATENT DOCUMENTS

| | | | | |
|---|---|---|---|---|
| 4,064,002 A | * | 12/1977 | Desmarchais | G21C 15/18 376/282 |
| 4,426,350 A | * | 1/1984 | Zegar | G21C 13/024 376/283 |
| 4,431,159 A | * | 2/1984 | Stubbs | F16K 1/34 251/63.6 |
| 4,463,774 A | * | 8/1984 | Gorges | B64C 1/1453 251/63.6 |
| 4,694,693 A | * | 9/1987 | Gerlowski | G21C 15/18 376/281 |
| 4,897,240 A | | 1/1990 | Sako | |
| 5,000,907 A | | 3/1991 | Chevereau et al. | |
| 5,011,652 A | | 4/1991 | Tominaga et al. | |
| 5,045,274 A | | 9/1991 | Donaldson | |
| 5,075,070 A | | 12/1991 | Costes | |
| 5,082,619 A | * | 1/1992 | Sawyer | G21C 15/18 376/283 |
| 5,087,408 A | | 2/1992 | Tominaga et al. | |
| 5,102,616 A | | 4/1992 | Gardner et al. | |

(Continued)

OTHER PUBLICATIONS

International Search Report and Written Opinion dated Sep. 30, 2015 for PCT/US15/10214.

*Primary Examiner* — Jack W Keith
*Assistant Examiner* — Daniel Wasil
(74) *Attorney, Agent, or Firm* — Nelson Mullins Riley & Scarborough LLP (57) ABSTRACT

A nuclear reactor is surrounded by a reactor radiological containment structure. Depressurization lines running from the reactor automatically vent the reactor to the containment structure or to a compartment in the containment structure when a low pressure condition exists in the reactor. The depressurization lines include biased-open passive valves and actively actuated isolation valves arranged in series.

11 Claims, 6 Drawing Sheets

(56) References Cited

U.S. PATENT DOCUMENTS

| | | | | |
|---|---|---|---|---|
| 5,158,742 A | * | 10/1992 | Dillmann | G21C 15/18 376/299 |
| 5,278,880 A | * | 1/1994 | Baker | G21C 13/02 376/285 |
| 5,301,216 A | | 4/1994 | Klapdor et al. | |
| 5,377,242 A | * | 12/1994 | Carlton | G21C 15/182 376/283 |
| 5,426,681 A | * | 6/1995 | Aburomia | G21C 9/004 376/283 |
| 5,517,538 A | | 5/1996 | Seidelberger et al. | |
| 6,795,518 B1 | | 9/2004 | Conway et al. | |
| 6,945,272 B2 | * | 9/2005 | Modro | F16K 15/06 376/283 |
| 2009/0260798 A1 | | 10/2009 | Brennan et al. | |
| 2012/0155597 A1 | * | 6/2012 | Cook | G21C 9/004 376/283 |
| 2012/0160346 A1 | | 6/2012 | Shelcoviz et al. | |
| 2013/0032743 A1 | | 2/2013 | Fong et al. | |
| 2013/0182812 A1 | * | 7/2013 | Eckardt | G21C 13/10 376/283 |
| 2013/0272478 A1 | * | 10/2013 | Malloy | G21C 13/02 376/352 |
| 2013/0294567 A1 | * | 11/2013 | Malloy | G21C 9/00 376/352 |

* cited by examiner

PASSIVELY INITIATED DEPRESSURIZATION VALVE FOR LIGHT WATER REACTOR

BACKGROUND

The following relates to the nuclear reactor arts, electrical power generation arts, nuclear safety arts, and related arts.

Nuclear reactors employ a reactor core comprising a mass of fissile material, such as a material containing uranium oxide ($UO_2$) that is enriched in the fissile $^{235}U$ isotope. Primary coolant water, such as light water ($H_2O$) or heavy water ($D_2O$) or some mixture thereof, flows through the reactor core to extract heat for use in heating secondary coolant water to generate steam or for some other useful purpose. For electrical power generation, the steam is used to drive a generator turbine. In thermal nuclear reactors, the primary coolant water also serves as a neutron moderator that thermalizes neutrons, which enhances reactivity of the fissile material. Various reactivity control mechanisms, such as mechanically operated control rods, chemical treatment of the primary coolant with a soluble neutron poison, or so forth are employed to regulate the reactivity and resultant heat generation. In a pressurized water reactor (PWR), the primary coolant water is maintained in a subcooled state in a sealed pressure vessel that also contains the reactor core, and the liquid primary coolant water flows through a steam generator located outside the pressure vessel or inside the pressure vessel (the latter being known as an integral PWR) to generate steam to drive a turbine. In a boiling water reactor (BWR), the primary coolant boils in the pressure vessel and is piped directly to the turbine. Some illustrative examples of integral PWR designs are set forth in Thome et al., "Integral Helical Coil Pressurized Water Nuclear Reactor", U.S. Pub. No. 2010/0316181 A1 published Dec. 16, 2010 which is incorporated herein by reference in its entirety, and in Malloy et al., "Compact Nuclear Reactor", U.S. Pub. No. 2012/0076254 A1 published Mar. 29, 2012 which is incorporated herein by reference in its entirety. These are merely illustrative examples.

In either a PWR or a BWR, the primary coolant water is maintained at controlled elevated temperature and pressure by heat generated in the radioactive nuclear reactor core balanced by heat sinking provided by steam generation and subsequent condensation (i.e. a steam cycle). In the event of a reactor vessel breach (known in the art as a loss of coolant accident, i.e. LOCA), primary coolant flashes to steam outside the pressure vessel. A radiological containment (sometimes called primary containment or simply containment) surrounds the pressure vessel to contain any such steam release, and an automatic reactor shutdown is performed to extinguish the nuclear reaction, typically including scram of control rods and optionally injection of borated water or another soluble neutron poison into the primary coolant in the pressure vessel. An emergency core cooling system (ECCS) and/or other safety systems also respond by removing decay heat from the nuclear reactor, condensing and recapturing any primary coolant steam released into the radiological containment, and depressurizing the reactor pressure vessel.

The pressure vessel depressurization entails venting primary coolant, typically in the form of steam, to a dedicated compartment, and/or into the containment or other sink. Initially, the high pressure inside the vessel provides substantial mass transport for the venting. As the pressure decreases, the mass transport rate for a given vent orifice decreases. To vent to atmospheric pressure in a reasonable time frame, the venting system opens additional valves as the pressure in the vessel decreases to increase the total orifice area and maintain a reasonable mass transport rate. Redundant valving must be provided in accord with safety regulations of the United States Nuclear Regulatory Commission (U.S. NRC; similar regulations apply in most other countries). This increases the cost and complexity of the venting system; and, even with redundant valving, there is the potential for failure at multiple points, including at the valve actuator or at electronics producing the actuation signal. Such a failure can delay reactor shutdown and increase the time the reactor remains pressurized in an abnormal state.

Disclosed herein are improvements that provide various benefits that will become apparent to the skilled artisan upon reading the following.

BRIEF SUMMARY

In one aspect of the disclosure, an apparatus comprises a nuclear reactor including a pressure vessel containing primary coolant water and a nuclear reactor core comprising fissile material, a radiological containment structure surrounding the nuclear reactor; and a passive pressure vessel depressurization system including a depressurization pipe having an inlet end connected to the pressure vessel and an outlet end, and further including an actively actuated isolation valve and a biased-open passive valve arranged in series along the depressurization pipe between the inlet end and the outlet end, the biased-open passive valve closing responsive to a positive pressure difference between the inlet end and the outlet end exceeding a setpoint value. In some embodiments, the apparatus includes a plurality of said passive pressure vessel depressurization systems with the biased-open passive valves having different setpoint values.

In another aspect of the disclosure, an apparatus comprises: a nuclear reactor including a pressure vessel containing primary coolant water and a nuclear reactor core comprising fissile material; and a pipe having an inlet end connected to the pressure vessel, an outlet end, and a depressurization pipe connected with the pressure vessel and having a biased-open passive valve configured to close responsive to pressurization of the pressure vessel above a setpoint pressure. In some embodiments the depressurization pipe further has an actively actuated isolation valve arranged in series with the biased-open passive valve. Optionally, the actively actuated isolation valve is integrated with the biased-open passive valve to actively close the biased-open passive valve.

In another aspect of the disclosure, a depressurization system comprises a plurality of depressurization pipes each having an inlet, an outlet, a biased-open passive valve configured to close when a positive pressure difference between the inlet and the outlet exceeds a setpoint pressure, and an actively actuated isolation valve arranged in series with the biased-open passive valve. The biased-open passive valves of the depressurization pipes have different setpoint pressures.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention.

DETAILED DESCRIPTION OF THE PREFERRED EMBODIMENTS

Figure 1:
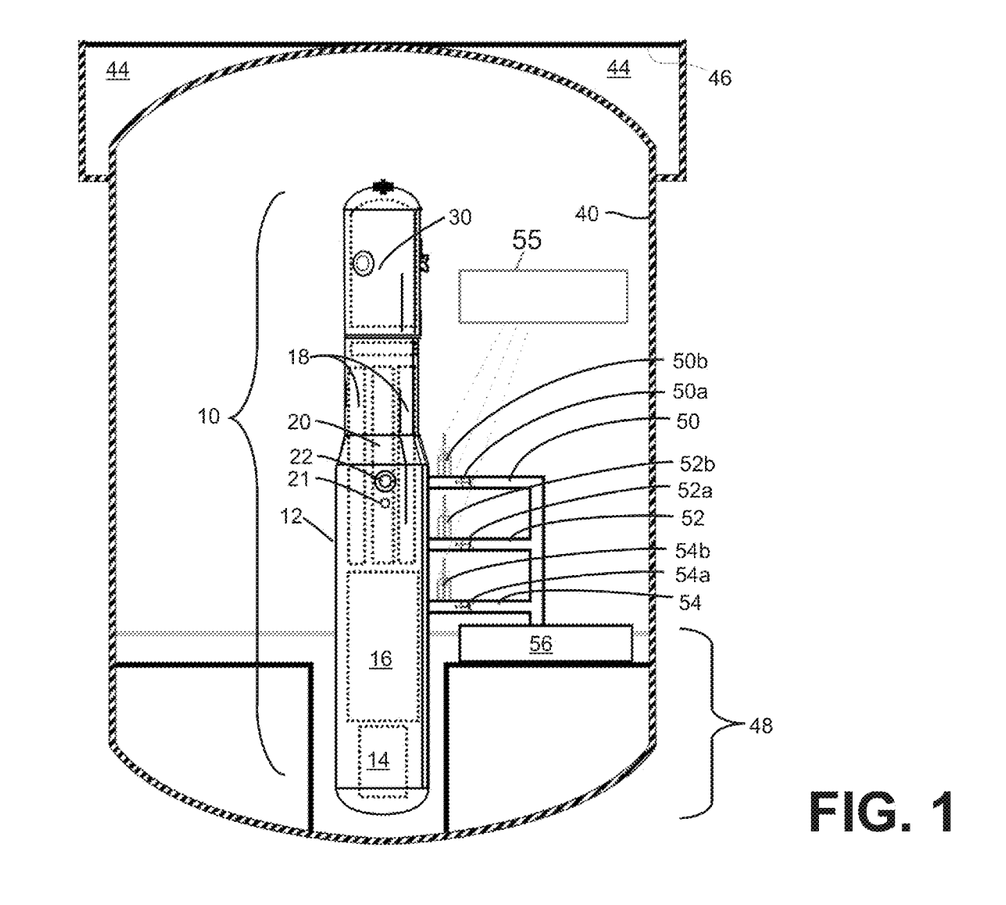
FIG. 1 diagrammatically shows an illustrative nuclear reactor and three passive depressurization systems which discharge into a shared tank.

With reference to FIG. 1, an illustrative nuclear reactor of the pressurized water reactor (PWR) type 10 includes a pressure vessel 12, which in the illustrative embodiment is a generally cylindrical vertically mounted vessel. Selected components of the PWR that are internal to the pressure vessel 12 are shown diagrammatically in phantom (that is, by dashed lines). A nuclear reactor core 14 is disposed in a lower portion of the pressure vessel 12. The reactor core 14 includes a mass of fissile material, such as a material containing uranium oxide ($UO_2$) that is enriched in the fissile $^{235}U$ isotope, in a suitable matrix material. In a typical configuration, the fissile material is arranged as "fuel rods" arranged in a core basket (details not shown). The pressure vessel 12 contains primary coolant water (typically light water, that is, $H_2O$, although heavy water, that is, $D_2O$, is also contemplated) in a subcooled state.

A control rod system 16 is mounted above the reactor core 14 and includes control rod drive mechanism (CRDM) units and control rod guide structures (details not shown) configured to precisely and controllably insert or withdraw control rods into or out of the reactor core 14. The illustrative control rod system 16 employs internal CRDM units that are disposed inside the pressure vessel 12. Some illustrative examples of suitable internal CRDM designs include: Stambaugh et al., "Control Rod Drive Mechanism for Nuclear Reactor", U.S. Pub. No. 2010/0316177 A1 published Dec. 16, 2010 which is incorporated herein by reference in its entirety; and Stambaugh et al., "Control Rod Drive Mechanism for Nuclear Reactor", Int'l Pub. WO2010/144563A1 published Dec. 16, 2010 which is incorporated herein by reference in its entirety. In general, the control rods contain neutron absorbing material, and reactivity is increased by withdrawing the control rods or decreased by inserting the control rods. So-called "gray" control rods are continuously adjustable to provide incremental adjustments of the reactivity. So-called "shutdown" control rods are designed to be inserted as quickly as feasible (e.g. fall under gravity) into the reactor core 12 to shut down the nuclear reaction in the event of an emergency. Various hybrid control rod designs are also known. For example, a gray rod may include a mechanism for releasing the control rod in an emergency so that it falls into the reactor core 12 thus implementing a shutdown rod functionality.

The illustrative PWR 10 is an integral PWR in that it includes an internal steam generator 18 disposed inside the pressure vessel 12. In the illustrative configuration, a cylindrical riser 20 is disposed coaxially inside the cylindrical pressure vessel 12. Primary coolant flows around and through the control rods system 16 and then flows upward, such that primary coolant water heated by the operating nuclear reactor core 14 rises upward through the cylindrical riser 20 toward the top of the pressure vessel, where it discharges, reverses flow direction and flows downward through an outer annulus defined between the cylindrical riser 20 and the cylindrical wall of the pressure vessel 12. This circulation may be natural circulation that is driven by reactor core heating and subsequent cooling of the primary coolant, or the circulation may be assisted or driven by primary coolant pumps (not shown). The illustrative steam generator 18 is an annular steam generator disposed in the outer annulus defined between the cylindrical riser 20 and the cylindrical wall of the pressure vessel 12. Secondary coolant enters and exits the steam generator 18 via suitable respective feedwater inlet 21 and steam outlet 22 ports of the pressure vessel 12. Typically, the feedwater flows upward through the steam generator 18 where it is heated by the proximate downwardly flowing primary coolant to heat the feedwater into steam. Various steam generator configurations can be employed. Some illustrative steam generators are described in Thome et al., "Integral Helical Coil Pressurized Water Nuclear Reactor", U.S. Pub. No. 2010/0316181 A1 published Dec. 16, 2010 which is incorporated herein by reference in its entirety; and Malloy et al., U.S. Pub. No. 2012/0076254 A1 published Mar. 29, 2012 which is incorporated herein by reference in its entirety. The illustrative PWR 10 is an integral PWR including the steam generator 18 disposed inside the pressure vessel 12. In other embodiments (not shown), the PWR is not an integral PWR; rather the steam generator is located externally and is connected with the reactor pressure vessel by suitable large-diameter piping carrying primary coolant to and from the steam generator.

Continuing with FIG. 1, the pressure vessel 12 defines a sealed volume that, when the PWR is operational, contains primary coolant water in a subcooled state. Toward this end, the PWR includes an internal pressurizer volume 30 disposed at the top of the pressure vessel 12. The internal pressurizer volume 30 contains a steam bubble of primary coolant whose pressure controls the pressure of the primary coolant water in the pressure vessel 12. Various resistive heaters, spargers, or so forth (not shown) are provided to control the steam bubble pressure. Alternatively, an external pressurizer (not shown) may be provided, and connected with the pressure vessel by suitable piping. By way of illustrative example, in some embodiments the primary coolant pressure in the sealed volume of the pressure vessel 12 is at a pressure of about 2000 psia and at a temperature of about 300-320° C. These are merely illustrative values, and a diverse range of other operating pressures and temperatures are also contemplated. In the case of a BWR, the pressure is lower, e.g. about 1000-1100 psi in some systems, to permit a portion of the primary coolant to boil.

With continuing reference to FIG. 1, the PWR 10 is disposed in a radiological containment structure 40, which may by way of illustrative example comprise concrete, steel, or steel-reinforced concrete. The radiological containment structure 40 is designed to contain any primary coolant (either steam or water) released from the PWR 10 in the event of a LOCA or design-basis intentional venting of the pressure vessel 12. In some embodiments, the containment structure 40 may be partially or wholly subterranean; for example, the illustrative containment 40 is mostly subterranean and includes an ultimate heat sink (UHS) pool 44 above the containment at about ground level 46. In the case of a LOCA due to a break at or below the top of the reactor core 14, a flood well 48 portion of the containment structure is designed to be flooded to keep the core submerged.

The illustrative PWR is merely an example, and it is to be understood that the reactor depressurization systems and methods disclosed herein are readily employed in conjunction with any type of nuclear reactor, e.g. an integral PWR (illustrated), or a PWR with an external steam generator, or a BWR, or so forth. Similarly, the illustrative radiological containment 40 is merely an example, and it is to be understood that the reactor depressurization systems and methods disclosed herein are readily employed in conjunction with any type of radiological containment, whether above-ground or partially or wholly subterranean, whether including or omitting a flood well, and regardless of the type and location of the ultimate heat sink.

FIG. 1 further shows one embodiment of the depressurization system comprising three passive depressurization lines 50, 52, and 54, each including a biased-open passive valve 50a, 52a, 54a and an actively actuated (e.g., motor-driven or hydraulically or pneumatically driven) isolation valve 50b, 52b, 54b. The illustrative biased-open passive valves 50a, 52a, 54a are spring-biased (see illustrative FIG. 4) into an open position which however is overcome by positive pressure in the pressure vessel 12 during normal reactor operation such that the valves 50a, 52a, 54a are closed during normal reactor operation. On the other hand, as the pressure in the vessel 12 decreases below a setpoint pressure, the spring bias overcomes the internal pressure of the vessel and opens the passive valve to initiate venting through the associated depressurization line. By designing the different passive valves 50a, 52a, 54a with different setpoint pressures, a sequential opening of the valves occurs as the pressure vessel depressurizes. The actively actuated isolation valves 50b, 52b, 54b are normally open, but can be closed by a depressurization systems controller 55 (for example, suitably embodied by a computer or other digital processing device) to prevent the respective passive valves 50a, 52a, 54a from opening to initiate venting when it is desired to lower the vessel pressure below the setpoints of the passive valves without initiating venting via depressurization lines 50, 52, 54. As the active valves 50b, 52b, 54b do not operate to perform the emergency depressurization, they are not safety-related, i.e. a failure of the active valves 50b, 52b, 54b cannot prevent operation of the depressurization system.

In the illustrative embodiment, the depressurization lines 50, 52, 54 discharge into a dedicated depressurization compartment or tank 56. For example, in some embodiments the tank 56 contains liquid water and the depressurization lines 50, 52, 54 terminate in one or more spargers (not shown) immersed in the water. Illustrative FIG. 1 shows the three depressurization lines 50, 52, 54 connecting to a common trunk line feeding into the tank 56; however, for redundancy it is contemplated to employ completely separate depressurization lines, e.g. with separate terminuses in the tank 56 or terminating in different tanks. Additionally, the depressurization lines may terminate at another sink or device. For example, in some embodiments one or more of the depressurization lines may vent directly into containment, or into a refueling water storage tank (RWST, not shown) inside containment 40. As another example, in some embodiments one or more of the depressurization lines may connect with a condenser (not shown) whose condensate discharge pipe connects back into the pressure vessel so as to form a closed-loop decay heat removal system. It is also to be appreciated that while three illustrative depressurization lines 50, 52, 54 with three corresponding independent valving arrangements are shown, this number may be one, two, three (as shown), four, or more.

Figure 2:
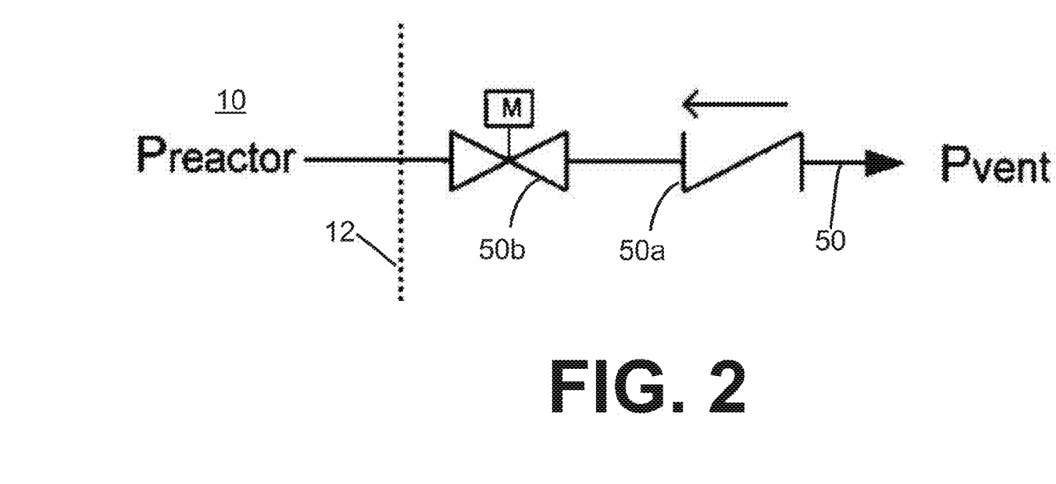
FIGS. 2 and 3 diagrammatically show alternative series arrangements of the valves of one of the depressurization systems.
Figure 3:
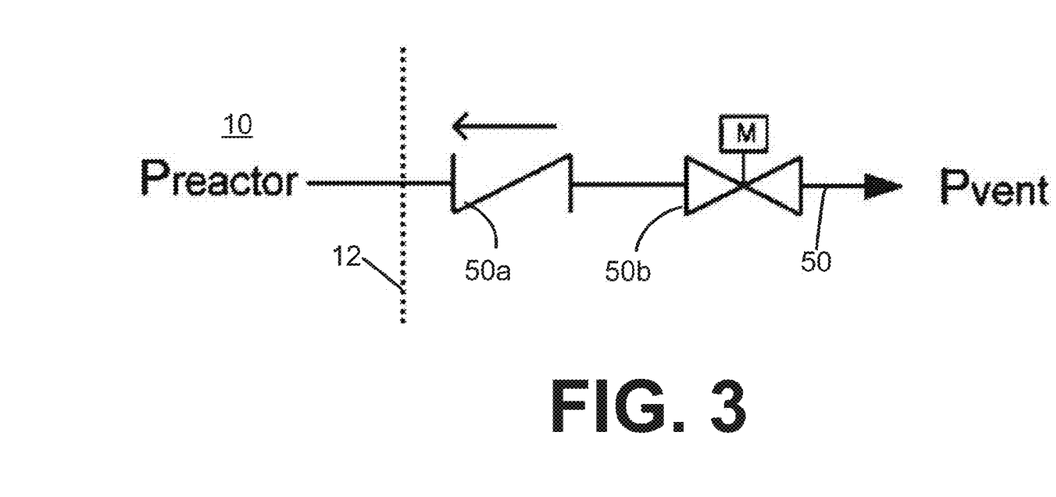

FIGS. 2 and 3 show two illustrative embodiments of the active valve 50b and passive valve 50a arranged in series along the depressurization line 50. (The structure for the other lines 52, 54 can be similar). In either embodiment, the passive valve 50a uses stored energy such as a compressed spring to open the valve. The spring allows the valve to be passively opened when there is low differential pressure between the valve inlet and exit. That is, the valve will open when $P_{reactor} - P_{vent} < P_{set}$ where $P_{reactor}$ is the pressure of the reactor pressure vessel 12, $P_{vent}$ is the pressure of the outlet of the valve (e.g. in the tank 56), and $P_{set}$ is the force of the spring holding the valve shut divided by the area of the valve disc. $P_{set}$ is the desired actuation pressure differential. Said another way, the valve opens with a positive pressure difference $P_{reactor} - P_{vent}$ falls below a setpoint pressure $P_{set}$; or, turned around, the biased-open passive valve 50a closes when the positive pressure difference $P_{reactor} - P_{vent}$ exceeds the setpoint pressure $P_{set}$. Once the pressure of the reactor, less the vent pressure, falls below the pressure of the set point, the spring overcomes the reactor pressure and opens the passive valve. It is again noted that the different passive valves 50a, 52a, 54a can have different values for $P_{set}$ and thus open at different times during the depressurization of the reactor. It is also noted that in a typical nuclear reactor, $P_{reactor} \gg P_{vent}$. For example, $P_{reactor}$ is about 1000-2000 psia for a typical nuclear reactor in normal operation, while $P_{vent}$ is typically at about atmospheric pressure (1 atm or 14.7 psia). Thus, the condition $P_{reactor} - P_{vent} < P_{set}$ for opening of the biased-open passive valve can typically be approximated well as $P_{reactor} < P_{set}$, and analogously the valve-closed condition is well-approximated as $P_{reactor} > P_{set}$.

In the embodiment shown in FIG. 2, the actively actuated isolation valve 50b is located in series with the passive valve 50a between the spring-biased passive valve 50a and the connection of the line 50 with the pressure vessel 12. In this embodiment closure of the actively actuated isolation valve 50b isolates the passive valve 50a from the pressure vessel 12.

In the embodiment shown in FIG. 3, the spring-biased passive valve 50a is located in series with the actively actuated valve 50b between the actively actuated isolation valve 50b and the pressure vessel 12. In this embodiment closure of the actively actuated isolation valve 50b does not physically isolate the passive valve 50a from the pressure vessel 12; however, the closure of the actively actuated isolation valve 50b does directly isolate, i.e. valve off, the depressurization line 50, so that even if the passive valve 50a opens during depressurization of the pressure vessel 12 it will not initiate depressurization via the depressurization line 50.

Both embodiments of FIGS. 2 and 3 include the actively actuated isolation valve 50b arranged in series with the biased-open passive valve 50a along the depressurization pipe 50 between the inlet end connecting with the pressure vessel 12 and the outlet end (which in FIG. 1 terminates in the tank 56). The biased-open passive valve 50a closes responsive to a positive pressure difference $P_{reactor} - P_{vent}$ between the inlet end and the outlet end exceeding the setpoint value $P_{set}$.

Figure 4:
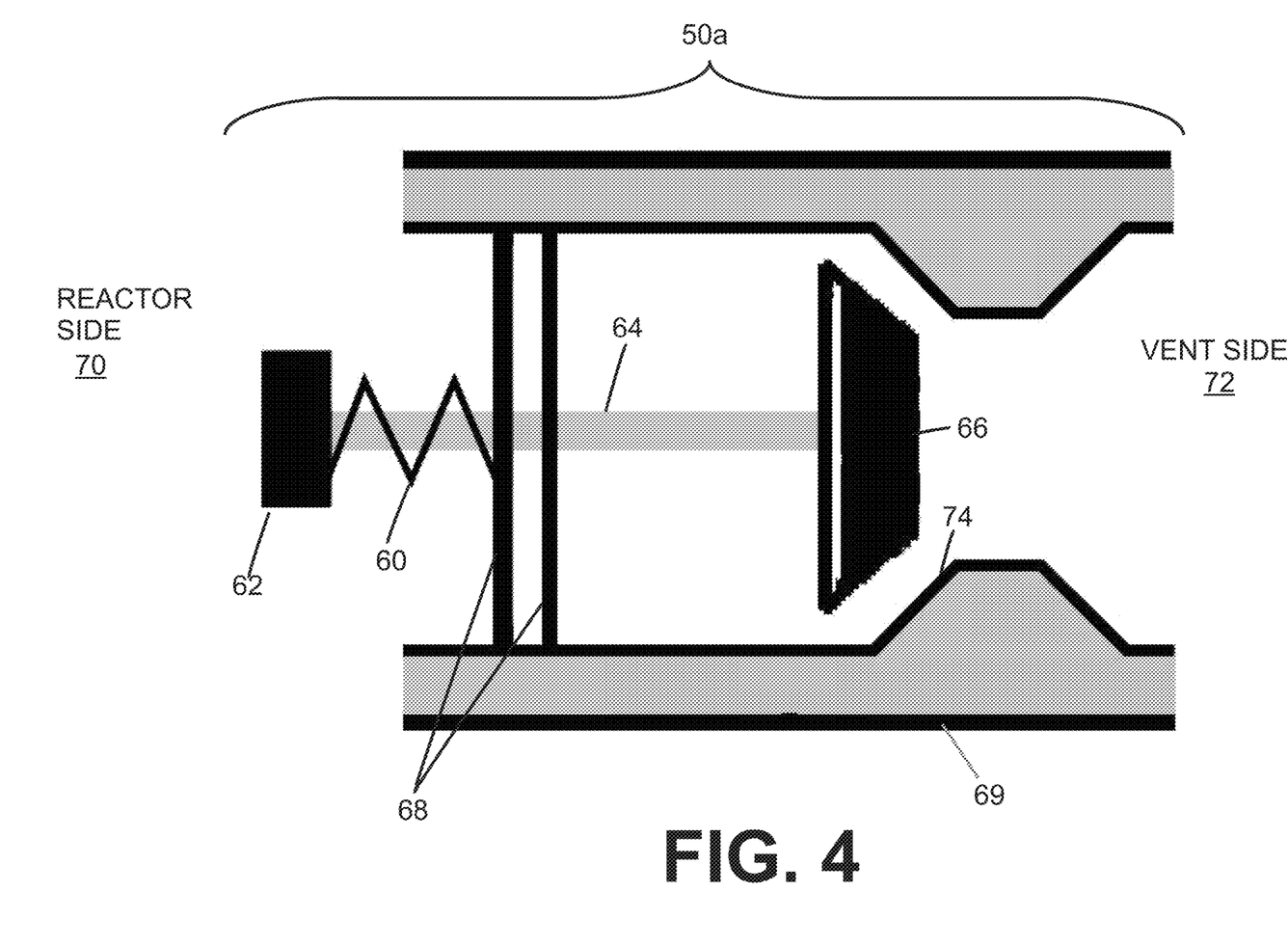
FIG. 4 diagrammatically shows a biased-open passive valve suitably used in any of the depressurization systems of FIGS. 1-3.

With reference to FIG. 4, an illustrative embodiment of the passive valve 50a is shown. A spring 60 when compressed exerts a force proportional to $P_{set}$ on a spring washer 62 or other terminus rigidly attached to a stem 64, which is also rigidly attached to a valve disc 66. The end of the spring 60 opposite from the spring washer 62 is connected to ribs or another fixed anchor 68 that is integral with or rigidly connected with the valve housing or body 69. The ribs or other supports 68 include flow openings (not shown) or are otherwise configured to present minimal flow obstruction and head loss. The valve disc 66 is shown in its open position—that is, the position it would be in with the reactor depressurized, or said another way its position when $P_{set}$ (defined by the force of the compressed spring 60 and the area of the valve disc 66) is greater than the difference $(P_{reactor}-P_{vent})$. On the other hand, if the pressure vessel 12 is pressurized such that the difference $(P_{reactor}-P_{vent})$ increases to a value greater than $P_{set}$, then pressure $P_{reactor}$ from the reactor side 70, less pressure $P_{vent}$ from the vent side 72, is large enough to overcome the bias $P_{set}$ exerted on the valve disc 66 by the spring 60 via the stem 64 and washer 62, overcoming $P_{set}$ and driving disc 66 against a valve seat 74 to close the valve 50a. Again, the passive valves 50b, 50c are suitably similar, but may have springs 60 exerting different compressed forces and/or valve disks 66 with different areas so as to have different $P_{set}$ values. It is also contemplated to employ passive biasing arrangements other than the illustrative compressed spring. For example, the spring can alternatively be configured to be placed into a tensile state when $(P_{reactor}-P_{vent})>P_{set}$. In another contemplated arrangement, the spring could be placed into compression but be located downstream of the valve disk.

For both embodiments of respective FIGS. 2 and 3, the actively driven isolation valve 50b is preferably a normally open valve (that is, a valve which opens or remains open upon removal of the electrical, hydraulic, or pneumatic actuation power) or a valve that holds its current position upon removal of actuator power. During normal reactor operation with $(P_{reactor}-P_{vent})>P_{set}$, the actively actuated valves 50b, 52b, 54b are open and the aforementioned valves remain in this open position if power is lost so that the depressurization system remains ready to operate. Thus, the depressurization system, once in operation, is advantageously entirely passive.

Figure 5:
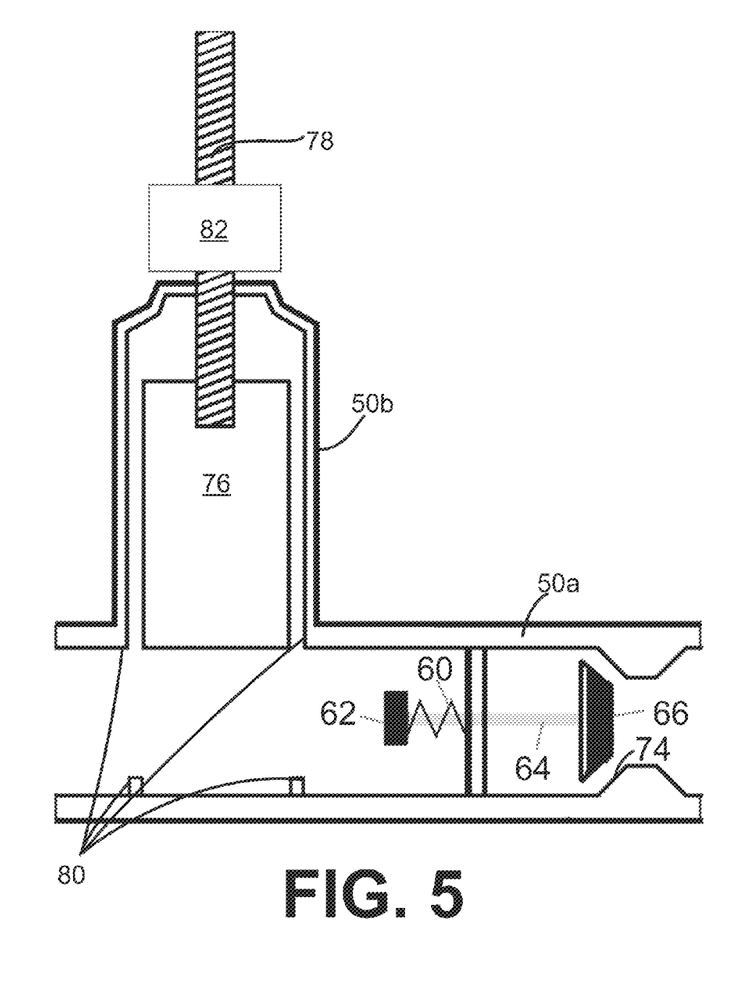
FIG. 5 diagrammatically shows an embodiment of the valve arrangement shown in FIG. 2.

FIG. 5 shows the passive valve 50a of FIG. 4 and its accompanying actively actuated isolation valve 50b located "upstream" as in the embodiment of FIG. 2. In the embodiment of FIG. 5, the actively actuated isolation valve 50b is a gate valve having a disc 76 which is actuated by actuator 82 connected to stem 78 to drive disc 76 into valve seat 80. As mentioned above, the actuator may be pneumatic, electric, or hydraulic. During normal reactor operations, the actively actuated isolation valve 50b is open, and the passive valve 50a, though biased open, is held closed by the force of reactor pressure. The isolation valve 50b enables the depressurization system to be placed "off-line" during reactor depressurization and re-pressurization, e.g. for routine maintenance.

In the embodiment of FIG. 5, the actively actuated isolation valve 50b and the passive valve 50a are separate and independent valves.

Figure 6:
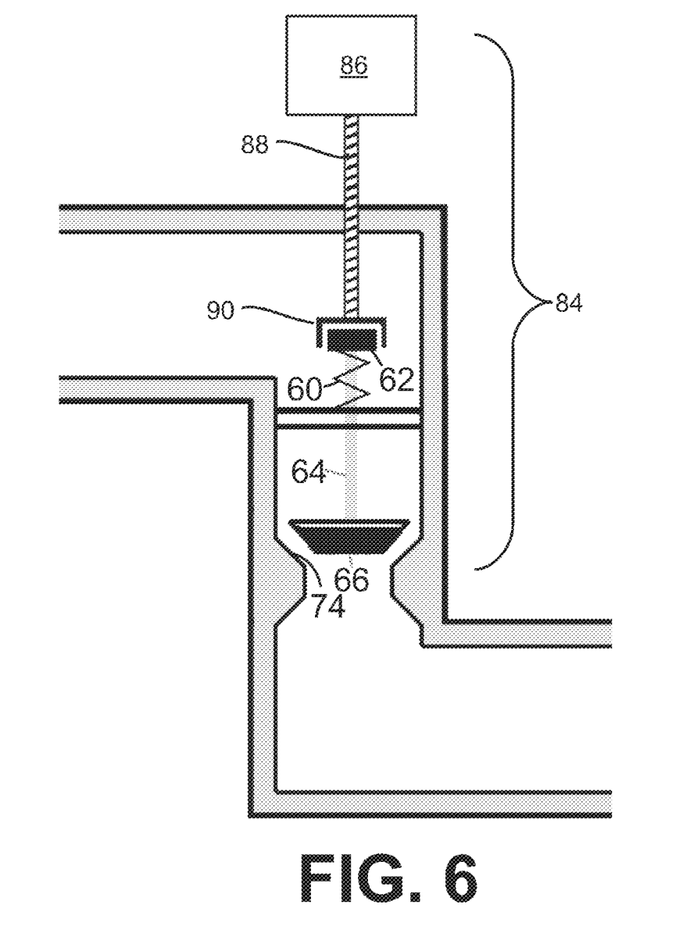
FIGS. 6 and 7 show two alternative embodiments in which the valves of FIG. 2 are constructed as a combined valve.

With reference to FIG. 6, the passive valve and the actively actuated isolation valve can be integrated, for example as in illustrative combined valve 84 shown in FIG. 6. The combined valve 84 includes the components 60, 62, 64, 66, 74 of the passive valve 50a of FIG. 4, with the actively actuated isolation valve being implemented as an integral powered actuator 86 to override the passive operation of the valve 84 in order to actively close the valve disc 66 onto the valve seat 74. The powered actuator 86 may be an electric motor, an air driven actuator (perhaps triggered by an electric solenoid), or a hydraulic actuator (operated by an electric block valve). The powered actuator 86 drives an actuator stem 88 connected to the engaging block 90 which engages the spring washer 62 to actively close the valve against the spring force. As seen in FIG. 6, which shows both the passive and active valve components in their disengaged position, when the actively actuated valve portion is in its illustrated disengaged position, the engaging block 90 is drawn away from the spring washer 62 to disengage the actively actuated valve portion from the valve disk 66 and enable unimpeded operation of the passive valve portion. Said another way, the actively actuated isolation valve is integrated with the biased-open passive valve, and the actively actuated isolation valve has (i) a closed position that actively closes the valve disk 66 against the valve seat 74 to close the valve and (ii) a disengaged position in which the actively actuated isolation valve is disengaged from the valve disk 66.

In the embodiment of FIG. 6, the actively actuated valve portion enables active closing of the combined valve, but does not allow active opening of the combined valve. That is, if $(P_{reactor}-P_{vent})>P_{set}$ and the combined valve is closed, then the actively actuated valve portion cannot actively open the valve. This may be acceptable since the main purpose of the actively actuated valve (or valve portion) is to actively close to keep the depressurization line valved off during routine maintenance.

Figure 7:
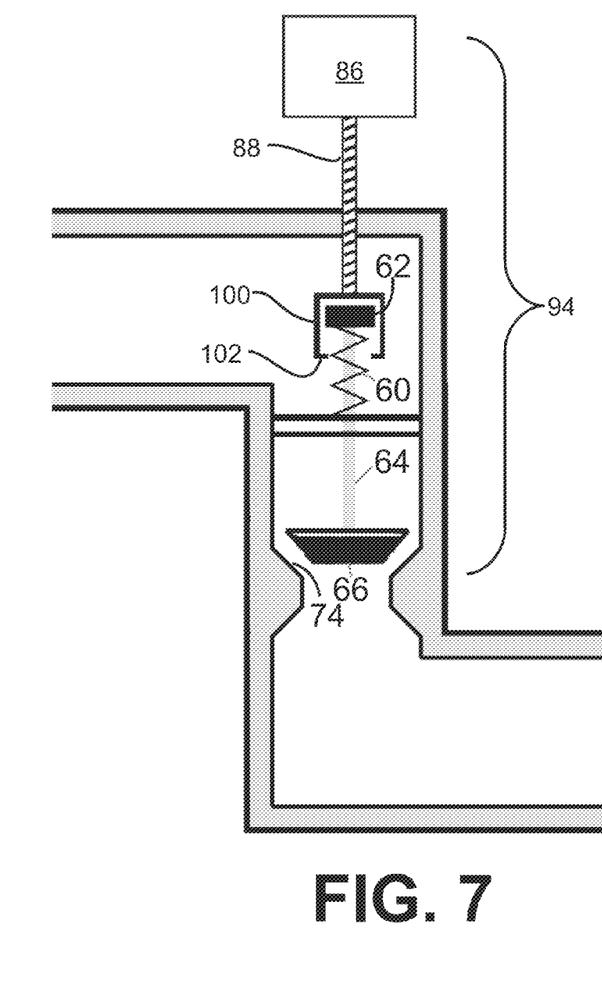

With reference to FIG. 7, an illustrative embodiment is shown of a combined valve 94 having an actively actuated portion providing both active closing and active opening. The embodiment of FIG. 7 is similar to that of FIG. 6, but the engaging block 90 of FIG. 6 is replaced by a modified engaging block 100 that includes a flange or lip 102. This lip 102 engages the spring washer 62 when the actuator 86 draws the actuator stem 88 back sufficiently far, so as to draw the valve disk 66 away from the valve seat 74 against the compressive force of the spring 60. Thus, the combined valve of FIG. 7 has: (i) a closed position that actively closes the valve disk 66 against the valve seat 74 to close the valve, (ii) a disengaged position in which the actively actuated isolation valve is disengaged from the valve disk 66, and (iii) an open position that actively draws the valve disk 66 away from the valve seat 74 to open the valve.

With returning reference to FIG. 1, operation of the bank of depressurization valves 50a, 52a, 54a, assumed here to have different set points $P_{set}$, is described. Starting with the pressure vessel 12 in an unpressurized state, the depressurization systems controller 55 causes the actively actuated valves 50a, 50b, 50c to close so as to prevent the depressurization systems from operating to depressurize the pressure vessel 12. The pressure vessel is then pressurized, and when the pressure difference $(P_{reactor}-P_{vent})$ exceeds the largest setpoint $P_{set}$ of any of the depressurization systems, the controller 55 causes the actively actuated valves 50a, 50b, 50c to open so as bring the depressurization systems "online". (In an alternative approach, each depressurization system can be brought online by opening its actively actuated valve when $(P_{reactor}-P_{vent})$ exceeds the setpoint $P_{set}$ for that system, so that each depressurization system is brought online as soon as practicable).

In the event of a LOCA, or an event causing pressure inside the pressure vessel 12 to rise above the design envelope pressure, or some other event calling for immediate depressurization, the initial depressurization occurs via the LOCA breach and/or via one or more active valves and/or passive (over)pressure relief valves (not shown). Initially, mass transport through these vent location(s) is relatively high, because the pressure in the pressure vessel 12 is high. However, as depressurization continues, the pressure in the pressure vessel 12 gradually decreases, which gradually reduces the mass transport rate. The resulting pressure-versus-time curve would decay in an exponential fashion with a long "tail", resulting in a long depressurization process.

In the embodiment of FIG. 1, however, when the pressure in the vessel 12 decreases to a point where $(P_{reactor}-P_{vent})<P_{set}$ for the depressurization system having the highest setpoint ($P_{set}$) value, the corresponding passive valve passively opens to provide a larger total orifice for venting, thus increasing the mass transport rate. As pressure in the vessel 12 falls further, more of the passive valves open, in the order of decreasing $P_{set}$ value. Optionally, there may be more than one valve with the same $P_{set}$ value, and these will then open at (about) the same time.

As an alternative to the arrangement of FIG. 1, the three depressurization lines 50, 52, 54 could join at a single pipe that connects to the reactor, so as to minimize the number or reactor penetrations. It is also contemplated to employ a single actively actuated isolation valve for all three (or two, or more than three) depressurization lines by locating that single actively actuated isolation valve on a common pipe feeding into or out of the plural depressurization lines.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

We claim:

1. An apparatus comprising:
   a nuclear reactor including a pressure vessel containing primary coolant water and a nuclear reactor core comprising fissile material;
   a radiological containment structure surrounding the nuclear reactor;
   a plurality of passive pressure vessel depressurization systems, each including a depressurization pipe having an inlet end connected to the pressure vessel and an outlet end, and further including an actively actuated isolation valve and a biased-open passive valve arranged in series along the depressurization pipe between the inlet end and the outlet end, each biased-open passive valve closing responsive to a positive pressure difference between the inlet end and the outlet end exceeding a setpoint value, and each biased-open passive valve having different setpoint value; and;
   a digital controller configured to (i) close the actively actuated isolation valves of the passive pressure vessel depressurization systems during scheduled depressurization and re-pressurization of the pressure vessel and (ii) open the actively actuated isolation valves of the passive pressure vessel depressurization systems when the positive pressure difference between the inlet end and the outlet end exceeds the largest setpoint value of the passive pressure vessel depressurization systems.

2. The apparatus of claim 1, wherein each actively actuated isolation valve is located between the corresponding biased-open passive valve and the pressure vessel along the corresponding depressurization pipe.

3. The apparatus of claim 1, wherein the biased-open passive valve is located between the actively actuated isolation valve and the pressure vessel along the depressurization pipe.

4. The apparatus of claim 1, wherein the outlet end of each depressurization pipe discharges into one of a tank and the radiological containment structure.

5. The apparatus of claim 1, wherein each biased-open passive valve further comprises a spring arranged to bias the valve open.

6. The apparatus of claim 5, wherein each biased-open passive valve further comprises a valve disk biased by the corresponding spring against a corresponding valve seat to close the valve.

7. The apparatus of claim 6, wherein each actively actuated isolation valve is integrated with the corresponding biased-open passive valve, each actively actuated isolation valve having (i) a closed position that actively closes the valve disk against the valve seat to close the valve and (ii) a disengaged position in which the actively actuated isolation valve is disengaged from the valve disk.

8. The apparatus of claim 7, wherein each actively actuated isolation valve further has (iii) an open position that actively draws the valve disk away from the valve seat to open the valve.

9. The apparatus of claim 1, wherein each actively actuated isolation valve is electrically actuated.

10. The apparatus of claim 1, wherein each actively actuated isolation valve is normally open and holds its current position upon removal of actuator power.

11. An apparatus comprising:
    a nuclear reactor including a pressure vessel containing primary coolant water and a nuclear reactor core comprising fissile material;
    a radiological containment structure surrounding the nuclear reactor;
    a plurality of passive pressure vessel depressurization systems, each including a depressurization pipe having an inlet end connected to the pressure vessel and an outlet end, and further including an actively actuated isolation valve and a biased-open passive valve arranged in series along the depressurization pipe between the inlet end and the outlet end, each biased-open passive valve closing responsive to a positive pressure difference between the inlet end and the outlet end exceeding a setpoint value, and each biased-open passive valve having different setpoint value; and;
    a digital controller configured to (i) close the actively actuated isolation valves of the passive pressure vessel depressurization systems during scheduled depressurization and re-pressurization of the pressure vessel and (ii) open the actively actuated isolation valve of each passive pressure vessel depressurization system when the positive pressure difference between the inlet end and the outlet end exceeds the setpoint value of that passive pressure vessel depressurization system.

* * * * *